US011161961B2

(12) United States Patent
Channu et al.

(10) Patent No.: US 11,161,961 B2
(45) Date of Patent: Nov. 2, 2021

(54) SHUTDOWN AND NON-SHUTDOWN SEPARATORS FOR ELECTROCHEMICAL DEVICES

(71) Applicant: Avomeen Analytical Services, Ann Arbor, MI (US)

(72) Inventors: Venkata S. Reddy Channu, Ann Arbor, MI (US); Shri Thanedar, Ann Arbor, MI (US)

(73) Assignee: Avomeen Analytical Services, Ann Arbor, MI (US)

( * ) Notice: Subject to any disclaimer, the term of this patent is extended or adjusted under 35 U.S.C. 154(b) by 316 days.

(21) Appl. No.: 15/493,534

(22) Filed: Apr. 21, 2017

(65) Prior Publication Data

US 2018/0309106 A1    Oct. 25, 2018

(51) Int. Cl.
| | |
|---|---|
| *H01M 2/16* | (2006.01) |
| *C08L 27/16* | (2006.01) |
| *C08L 81/10* | (2006.01) |
| *C08K 3/00* | (2018.01) |
| *C08K 3/013* | (2018.01) |
| *H01M 50/446* | (2021.01) |

(52) U.S. Cl.
CPC .............. *C08K 3/013* (2018.01); *C08L 27/16* (2013.01); *C08L 81/10* (2013.01); *H01M 50/446* (2021.01)

(58) Field of Classification Search
CPC .............................. H01M 2/166; C08L 27/16
See application file for complete search history.

(56) References Cited

U.S. PATENT DOCUMENTS

| | | | | |
|---|---|---|---|---|
| 2007/0128512 A1* | 6/2007 | Kaimai | ................ | B01D 69/12 |
| | | | | 429/144 |
| 2010/0203396 A1* | 8/2010 | Murata | ............... | H01M 50/449 |
| | | | | 429/247 |
| 2011/0123850 A1* | 5/2011 | Duong | ................ | H01M 2/1653 |
| | | | | 429/145 |
| 2012/0082884 A1* | 4/2012 | Orilall | ................. | H01M 2/1646 |
| | | | | 429/145 |
| 2015/0072212 A1* | 3/2015 | Mikami | ................ | H01M 2/145 |
| | | | | 429/144 |

* cited by examiner

*Primary Examiner* — Brian R Ohara
*Assistant Examiner* — Brent C Thomas
(74) *Attorney, Agent, or Firm* — Clements Bernard Walker; Christopher L. Bernard

(57) ABSTRACT

The present invention provides a novel process that involves a reliable, robust, reproducible, and cost effective casting technique for a shutdown separator with, for example, a combination of poly(vinylidene fluoride-co-hexafluoropropylene) (PVdF-HFP) copolymer, polysulfonamide (PSA)/polyether imide (PEI), and CaCO3 powder, and for a non-shutdown separator with, for example, a combination of polysulfonamide (PSA)/polyether imide (PEI), filler/plasticizer, and metal oxide nanostructures (SiO2, TiO2, and Al2O3).

10 Claims, 12 Drawing Sheets

SHUTDOWN AND NON-SHUTDOWN SEPARATORS FOR ELECTROCHEMICAL DEVICES

STATEMENT OF GOVERNMENT SUPPORT

The present invention was made with U.S. Government support under Award No. N68335-16-C-0251 awarded by the Department of the Navy. The U.S. Government may have certain rights in the present invention accordingly.

FIELD OF THE INVENTION

The present invention relates generally to electrochemical devices. More specifically, the present invention relates to shutdown and non-shutdown separators for electrochemical devices.

BACKGROUND OF THE INVENTION

Batteries have been utilized for many years as electrical power generators in remote locations, for example. Through the controlled movement of ions between electrodes (anode and cathode), a power circuit is generated, thereby providing a source of electricity that can be utilized until the excess ions in one electrode are depleted and no further electrical generation is possible. In more recent years, rechargeable batteries have been created to allow for longer lifetimes for such remote power sources, although through the need for connecting such batteries to other electrical sources for a certain period of time. All in all, however, the capability of reusing such a battery has led to greater potentials for use, particularly through laptop computer and mobile phone usage and, even more so, to the possibility of automobiles that solely require electricity to function.

Such batteries typically include at least five distinct components. A case (or container) houses everything in a secure and dependable manner to stop leakage to the outside, as well as environmental exposure inside. Within the case are an anode and a cathode, separated effectively by a separator, as well as an electrolyte solution (low viscosity liquid) that transports ions through the separator between the anode and cathode. The rechargeable batteries of today and, presumably tomorrow, will run the scale of rather small and portable devices, but with a great deal of electrical generation potential in order to remain effective for long periods between charging episodes, to very large types present within automobiles, as an example, that include large electrodes (at least in surface area) that must not contact one another and a large number of ions that must consistently and constantly pass through a membrane to complete the necessary circuit, all at a level of power generation conducive to providing sufficient electricity to run an automobile motor. As such, the capability and versatility of battery separators in the future must meet certain requirements that have yet to be provided within the current industry.

Generally speaking, battery separators have been utilized since the beginning of closed cell batteries to provide necessary protection from unwanted contact between electrodes, as well as to permit effective transport of electrolytes within power generating cells. Typically, such materials have been of film structure, sufficiently thin to reduce the weight and volume of a battery device while imparting the necessary properties noted above at the same time. Such separators must exhibit other characteristics, as well, to allow for proper battery function. These include chemical stability, suitable porosity of ionic species, effective pore size for electrolyte transfer, proper permeability, effective mechanical strength, and the capability of retaining dimensional and functional stability when exposed to high temperatures (as well as the potential for shutdown if the temperature rises to an abnormally high level).

In greater detail, the separator material must be of sufficient strength and constitution to withstand a number of different scenarios. Initially, the separator must not suffer tears or punctures during the stresses of battery assembly. In this manner, the overall mechanical strength of the separator is extremely important, particularly as high tensile strength material in both the machine and cross (transverse) directions allows the manufacturer to handle such a separator more easily and without stringent guidelines lest the separator suffer structural failure or loss during such a critical procedure.

Additionally, from a chemical perspective, the separator must withstand the oxidative and reductive environment within the battery itself, particularly when fully charged. Any failure during use, specifically in terms of structural integrity permitting abnormally high amounts of current to pass or for the electrodes to touch, would destroy the power generation capability and render the battery totally ineffective. Thus, even above the ability to weather chemical exposure, such a separator must also not lose dimensional stability (warp or melt) or mechanical strength during storage, manufacture, and use, either, for the same reasons noted above. Simultaneously, however, the separator must be of proper thickness to, in essence, facilitate the high energy and power densities of the battery, itself. A uniform thickness is quite important, too, in order to allow for a long life cycle as any uneven wear on the separator will be the weak link in terms of proper electrolyte passage, as well as electrode contact prevention.

Additionally, such a separator must exhibit proper porosity and pore sizes to accord, again, the proper transport of ions through such a membrane (as well as proper capacity to retain a certain amount of liquid electrolyte to facilitate such ion transfer during use). The pores themselves should be sufficiently small to prevent electrode components from entering and/or passing through the membrane, while also allowing, again, as noted above, for the proper rate of transfer of electrolyte ions. As well, uniformity in pore sizes, as well as pore size distribution, provides a more uniform result in power generation over time as well as more reliable long-term stability for the overall battery as, as discussed previously, uniform wear on the battery separator, at least as best controlled in such a system, allows for longer life-cycles. It additionally can be advantageous to ensure the pores therein may properly close upon exposure to abnormally high temperatures to prevent excessive and undesirable ion transfer upon such a battery failure (to prevent fires and other like hazards).

As well, the pore sizes and distributions may increase or decrease the air resistance of the separator, thus allowing for simple measurements of the separator that indicate the ability of the separator to allow adequate passage of the electrolyte present within the battery itself. For instance, mean flow pore size can be measured according to ASTM E-1294, and this measurement can be used to help determine the barrier properties of the separator. Thus, with low pore size, the rigidity of the pores themselves (the ability of the pores to remain a certain size during use over time and upon exposure to a set pressure) allows for effective control of electrode separation as well. More importantly, perhaps, is the capability of such pore size levels to limit dendrite formation in order to reduce the chances of crystal formation on an anode (such as lithium crystals on a graphite anode) that would deleteriously impact the power generation capability of the battery over time.

Furthermore, the separator must not impair the ability of the electrolyte to completely fill the entire cell during manufacture, storage, and use. Thus, the separator must exhibit proper wicking and/or wettability during such phases in order to ensure the electrolyte in fact may properly transfer ions through the membrane; if the separator were not conducive to such a situation, then the electrolyte would not properly reside on and in the separator pores and the necessary ion transmission would not readily occur. Additionally, it is understood that such proper wettability of the separator is generally required in order to ensure liquid electrolyte dispersion on the separator surface and within the cell itself. Non-uniformity of electrolyte dispersion may result in dendritic formations within the cell and on the separator surface, thereby creating an elevated potential for battery failures and short circuiting therein.

There is also great concern with the dimensional stability of such a separator when utilized within a typical lithium ion cell, as alluded to above. The separator necessarily provides a porous barrier for ion diffusion over the life of the battery, certainly. However, in certain situations, elevated temperatures, either from external sources or within the cell itself, may expose susceptible separator materials to undesirable shrinking, warping, or melting, any of which may deleteriously affect the capability of the battery over time. As such, since reduction of temperature levels and/or removal of such battery types from elevated temperatures during actual utilization are very difficult to achieve, the separator itself should include materials that can withstand such high temperatures without exhibiting any appreciable effects upon exposure.

Alternatively, the utilization of combinations of materials wherein one type of fiber, for instance, may provide such a beneficial result while still permitting the separator to perform at its optimum level, would be highly attractive.

To date, however, as noted above, the standards in place do not comport to such critical considerations. The general aim of an effective battery separator is to provide such beneficial characteristics all within a single thin sheet of material. The capability to provide low air resistance, very low pore size and suitable pore size distribution, dimensional stability under chemical and elevated temperature environments, proper wettability, optimal thickness to permit maximum battery component presence in the smallest enclosure possible, and effective overall tensile strength (and preferably isotropic in nature), are all necessary in order to accord a material that drastically reduces any potential for electrode contact, but with the capability of controlled electrolyte transport from one portion of the battery cell to the other (closing the circuit to generate the needed electrical power), in other words for maximum battery output over the longest period of time with the least amount of cell volume. Currently, such properties are not effectively provided in tandem to such a degree. For instance, one manufacturer has disclosed and marketed an expanded film battery separator with very low pore size, which is very good in that respect, as noted above; however, the corresponding air resistance for such material is extremely high, thus limiting the overall effectiveness such a separator. To the contrary, another manufacturer commercializes a nanofiber nonwoven membrane separator that provides low air resistance, but with overly large pore sizes therein. Additionally, the overall mechanical strengths exhibiting by these two materials are very limiting; the first separator has excellent strength in the machine direction, but nearly zero strength in the cross (transverse) direction. Such low cross direction strength requires very delicate handling during manufacture, at least, as alluded to above. The second material fares a little better, except that the strengths are rather low in both directions, although with a cross direction that is higher than the first material. In actuality, the second product is closer to an isotropic material (nearly the same strengths in both machine and cross directions), thus providing a more reliable material in terms of handling than the first product. However, the measured tensile strengths of the second separator are quite low in effect, thus relegating the user to carefully manipulation and placing such materials during manufacture as well. Likewise, the dimensional stability of such prior battery separators are highly suspect due to these tensile strength issues, potentially leading to materials that undesirably lose their structural integrity over time when present within a rechargeable battery cell.

Thus, there still exists a need to provide a battery separator that simultaneously provides all of these characteristics for long-term, reliable, lithium battery results. As such, although such a separator exhibiting low air resistance and low pore size, as well as high tensile strength overall and at relatively isotropic levels, proper chemical stability, structural integrity, and dimensional stability (particularly upon exposure to elevated temperatures), is highly desired, to date there has been a decided lack of provision of such a worthy separator material. Additionally, a manner of producing battery separators that allows for achieving such desired targeted property levels through efficient manufacturing processes would also be highly desired, particularly if minor medications in materials selection, etc., garners such beneficial results and requirements on demand; currently, such a manufacturing method to such an extent has yet to be explored throughout the battery separator industry. As such, an effective and rather simple and straightforward battery separator manufacturing method in terms of providing any number of separators exhibiting such versatile end results (targeted porosity and air resistance levels through processing medications on demand) as well as necessary levels of mechanical properties, heat resistance, permeability, dimensional stability, shut down properties, and meltdown properties, is prized within the rechargeable battery separator industry; to date, such a material has been unavailable.

Through a proper selection of materials as well as production processes, the resultant battery separator of the present invention exhibits isotropic strengths, low shrinkage, high wettability levels, and pore sizes related directly to layer thickness. The overall production method is highly efficient and yields a combination of polymers within a ceramic nanostructures matrix and/or onto such a substrate through high shear processing that is cost effective as well. The separator, a battery including such a separator, the method of manufacturing such a separator, and the method of utilizing such a separator within a battery device, are provided by the present invention.

Lithium ion batteries have been widely expanded into some newly promising fields, such as portable electronic equipment and hybrid electric vehicles, because they offer high energy density and high power density. The lithium ion battery separator plays an important role in preventing internal electrical short circuit, and at the same time allowing fast lithium ion transport between cathode and anode. Commercially available polyolefin-based separators (polyethylene (PE) and polypropylene (PP) separators) possess several advantages, such as thermal shut-down properties, good electrochemical stability, and proper mechanical strength. However, these polyolefin-based separators suffer from low porosity, poor electrolyte wettability, and severe thermal shrinkage at elevated temperature. The poor electrolyte wettability impairs the rate capability and cycling stability of the battery, and brings a series of disadvantages in the manufacturing process. The severe thermal shrinkage of polyolefin-based separators causes serious internal electrical short circuit, thus finally leading to fire disaster or explosion when the cells are exposed to abnormal conditions. Therefore, tremendous efforts have been made to develop high performance separators with enhanced electrochemical properties and better safety characteristics.

In the view of battery safety, some separators are very promising for high energy and power Li-ion batteries, if their other performances and cost can be made competitive with the current polyolefin separators. Present development of Li-ion battery separators will be made by balancing the performance against safety and cost. The high cost of separators is mainly due to their production process; therefore, developing a more cost-effective process is very important for the reduction of battery separator cost. The separators that combine the features of thermal shutdown and ceramic separators are highly desirable, and such separators could be developed based on existing separators by replacing the PET matrix with a porous PSA/PVDF-HFP shutdown matrix and PSA and PEI non-shutdown matrix.

Since the introduction of separators such as safety-reinforced separators (SRS), various ceramic composite separators have been proposed for practical use in LIBs. For example, some have proposed a ceramic composite separator that is made of Al2O3 ceramic powder and a polymer binder on a PE framework and that exhibits good thermal stability. Others have also reported a CaCO3-based composite separator with excellent thermal stability, in which CaCO3 ceramic particles coating the separator act as a heating-resistant material suppressing the thermal shrinkage of the separator. Previous works have largely focused on the improvement of thermal properties of separators by incorporating various ceramic particles.

BRIEF SUMMARY OF THE INVENTION

The present invention finds a solution to the problem plaguing the industry for many years to obtain shutdown and non-shutdown separators that have both high mechanical strength (machine and transverse direction), good ionic conductivity, thermal stability, high porosity, and better wettability. The solution is accomplished through a novel process that involves a reliable, robust, reproducible, and cost effective casting technique for a shutdown separator with, for example, a combination of poly(vinylidene fluoride-co-hexafluoropropylene) (PVdF-HFP) copolymer, polysulfonamide (PSA), polyether imide (PEI), and CaCO3 powder, and for a non-shutdown separator with, for example, a combination of polysulfonamide (PSA), filler/plasticizer and metal oxide nanostructures (SiO2, TiO2, and Al2O3) and polyether imide (PEI), and filler/plasticizer and metal oxide nanostructures (SiO2, TiO2, and Al2O3).

It is an object of the present invention to provide shutdown and non-shutdown separators that possess improved air permeability, and that are low in electrical impedance. It is another object of the present invention to provide such non-shutdown separators that possess high thermal resistance. It is yet another object of the present invention is to produce electrochemical device separators having improved safety features for use in electrochemical devices. In yet another object of the present invention thermal runaway is avoided. In yet another object of the present invention high thermal resistance is provided. It is yet another object of the present invention to provide an enhanced holding capacity and a uniform surface appearance when a winding tube is provided and used for spiral wound separators. It is yet another object of the present invention to provide an enhanced holding capacity and a uniform surface appearance when used in enveloping by an enveloping machine for prismatic cells, therefore increasing the electrolyte retention, wicking action, and ease of assembly. It is yet another object of the present invention to provide electrochemical device separators that have lower material costs and can also be mass-produced at relatively low costs.

In one exemplary embodiment, the present invention provides a shutdown separator for an electrochemical device, comprising: a poly(vinylidene fluoride-co-hexafluoropropylene) (PVdF-HFP) copolymer; polysulfonamide (PSA); polyether imide (PEI); and CaCO3; wherein these components are mixed and cast in combination into a planar structure. The planar structure has a thickness of between about 10μ and about 100μ. The planar structure has a porosity of between about 50% and about 80%. Optionally, the shutdown separator further comprises one or more of polystyrene (PS), polyvinyl pyrrolidone (PVP), and metal oxide nanostructures (such as $SiO_2$, $TiO_2$, and/or $Al_2O_3$). The planar structure is disposed within an electrolyte solution disposed with the electrochemical device. The electrochemical device further comprises a housing containing the planar structure, the electrolyte solution, an anode, and a cathode.

In another exemplary embodiment, the present invention provides a non-shutdown separator for an electrochemical device, comprising: polysulfonamide (PSA); polyether imide (PEI); and filler/plasticizer and metal oxide nanostructures; wherein these components are mixed and cast in combination into a planar structure. The planar structure has a thickness of between about 10μ and about 70μ. The planar structure has a porosity of between about 60% and about 200%. Optionally, the non-shutdown separator further comprises one or more of a polyaramid, a polysulfonamide, an aromatic polyimide, a polyamideimide, a polybenzoxazole, a polybenzimidazole, a polybenzthiazole, cellulose acetate, cellulose pulp, a highly aromatic epoxy, a crosslinked silicone, a polyetherimide, a polyesterimide, a polysulfone, a polyether sulfone, a polyketone, a polyether ketone, a polyphenylene oxide, polyphenylene sulfide, and an aromatic polyester. The metal oxide nanostructures comprise one or more of SiO2, TiO2, and Al2O3. The metal oxide nanostructures comprise one or more of nanospheres, nanowires, nanorods, and nanofibers. The planar structure is disposed within an electrolyte solution disposed with the electrochemical device. The electrochemical device further comprises a housing containing the planar structure, the electrolyte solution, an anode, and a cathode.

The shutdown separators of the present invention are produced by casting of a precursor of a polymer composition comprising a polymer and a filler. Optionally, the polymer composition may also include conventional additives, such as stabilizers, antioxidants, and/or the like. Any polymer suitable for film production may be used for making the battery separator of the present invention. Examples of such polymers include, but are not limited to, poly(vinylidene fluoride-co-hexafluoropropylene) (PVdF-HFP) copolymer, poly(vinylidene fluoride) polyolefins, polysulfones, polyvinyl chloride, polyvinyl fluoride, polytetrafluoroethylene-polystyrene copolymers, polyamides, polyphenyleneoxide-polystyrene copolymers, polycarbonates, polyvinylpyrrolidone, and the like. Preferably, the polymers should be chosen such that the shutdown temperature falls within the range of from about 100° C. to about 160° C., preferably from about 120° C. to about 140° C. To achieve shutdown temperatures, it is preferred to use poly(vinylidene fluoride-co-hexafluoropropylene) (PVdF-HFP) copolymer and blend of any of the above polymers. Fillers useful in the present invention must have a low affinity for and a significantly lower elasticity than polymer component. At the same time, fillers should have some interaction with the polymer. The fillers used must also have a melting point higher than that of the polymer used in the polymer composition. In addition, suitable fillers preferably are non-hygroscopic and water-insoluble. By "non-hygroscopic" is intended that the filler does not absorb moisture from the air. Fillers may be any inorganic or organic material. Preferably, the filler should be a rigid material having a non-smooth surface. Examples of suitable fillers include, but are not limited to, alumina, antimony oxide, mica, barium carbonate, barium sulfate, calcium carbonate, calcium oxide, calcium sulfate, clay, diatomaceous earth, glass powder, kaolin, magnesium carbonate, magnesium sulfate, magnesium oxide, silica, silica clay, talc, titanium oxide, zinc oxide, etc. Examples of organic fillers include, but are not limited to, polymer powders, such as powders of poly(hexamethylene adipamide), polyethylene terephthalate, beads of polystyrene divinyl benzene, and the like. Calcium carbonate, silica, alumina, titanium oxide, antimony oxide are particularly preferred for use as the filler in this invention. In addition, the inorganic fillers such as calcium carbonate are preferably surface treated by coating on their surface with, for example, calcium stearate. The amount of filler added to the polymer depends on the desired properties of the microporous film, including mechanical performance, permeability, and electrical resistance. Generally, the amount of filler used varies with different fillers. For example, in a polymer composition comprising PVDF-HFP as polymer and calcium carbonate as filler, the amount of calcium carbonate preferably is from about 30 percent to about 50 percent by weight of the polymer composition. The particle size of the filler is determined to be very critical in this invention to make shutdown separators. Preferably, smaller particles should be used in order to produce thinner microporous film. Among the commercially available fillers, it is found that a particle size of from 0.1 to 1 micron is most appropriate for producing thin microporous films. For a shutdown separator, the amount of metal oxide should be less than 30 percent by weight in the blend. More preferably this amount should be between 10 and 25 percent by weight.

For a non-shutdown separator, the amount of metal oxide should be greater than 40 percent by weight in the blend. More preferably this amount should be between 40 and 70 percent by weight. The non-shutdown separator comprises a polymer that does not melt at temperatures below 200° C. and an inorganic particulate filler selected from inorganic metal oxides. The non-shutdown separator contains from 40 to 70 weight percent inorganic particulate filler based on the total weight of the separator, and the separator has an average thickness of at least 25 microns. In an exemplary embodiment, the non-shutdown separator is comprised of polymer that does not melt at temperatures below 270° C. In another exemplary embodiment, the non-shutdown separator polymer film contains at least 40 weight percent of the inorganic particulate filler and at least 50 weight percent of pore former based on the total weight of the separator. The inorganic particulate filler of the non-shutdown separator is selected from the group of mica, talc, vermiculite, calcined clay, silica, alumina, titania, acicular titanium dioxide, wollastonite, boron nitride, calcinated kaolin clay and combinations thereof. In an exemplary embodiment, the non-shutdown separator is selected from the group of polyaramids, polysulfonamides, aromatic polyimides, polyamideimides, polybenzoxazoles, polybenzimidazoles, polybenzthiazoles, cellulose acetate, cellulose pulp, highly aromatic epoxies, crosslinked silicones, polyetherimides, polyesterimides, polysulfones and polyether sulfones, polyketones and polyether ketones, polyphenylene oxides, polyphenylene sulfide, aromatic polyesters, and combinations thereof. In an exemplary embodiment, the inorganic particulate filler in said non-shutdown separators has an average particle size of from 0.1 to 1 microns. In an exemplary embodiment, the non-shutdown separator is comprised of polymer that does not melt at temperatures below 300° C. In another exemplary embodiment, the non-shutdown separator polymer film contains from 5-50 weight percent of the plasticizer (PEG400/Tryethyal citrate/oils) of the total weight of the separator.

BRIEF DESCRIPTION OF THE DRAWINGS

The present invention is illustrated and described herein with reference to the various drawings, in which like reference numbers are used to denote like device components/method steps, as appropriate, and in which.

DETAILED DESCRIPTION OF THE INVENTION

Figure 1:
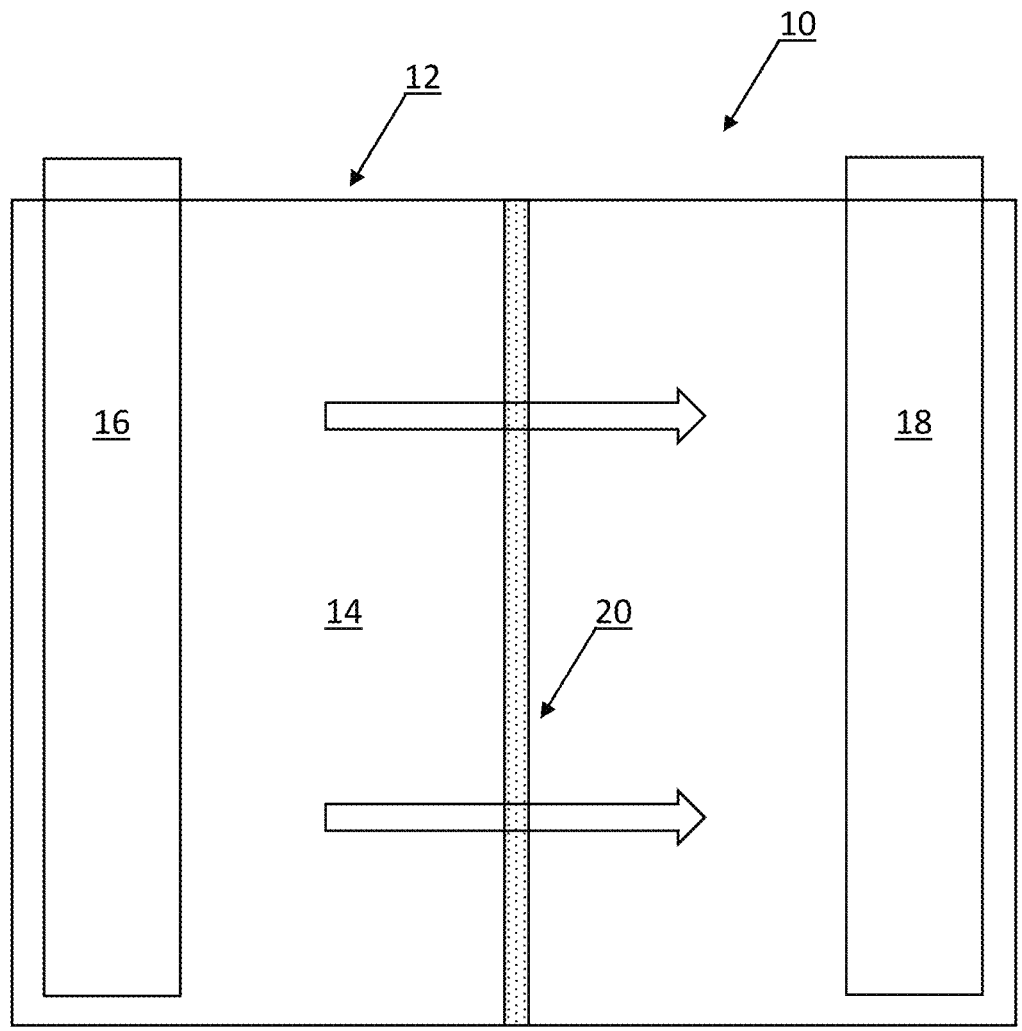
FIG. 1 is a schematic diagram illustrating one exemplary embodiment of a conventional electrochemical device (battery) utilizing the shutdown or non-shutdown separator of the present invention.

FIG. 1 is a schematic diagram illustrating one exemplary embodiment of a conventional electrochemical device (battery) utilizing the shutdown or non-shutdown separator of the present invention. In general, the battery 10 includes a housing 12 containing an electrolyte solution 14 enabling the transport of ions from an anode 16 to a cathode 18 through a separator 20, such as the shutdown or non-shutdown separator of the present invention, in the discharge of electrical current.

As described herein above, the present invention finds a solution to the problem plaguing the industry for many years to obtain shutdown and non-shutdown separators that have both high mechanical strength (machine and transverse direction), good ionic conductivity, thermal stability, high porosity, and better wettability. The solution is accomplished through a novel process that involves a reliable, robust, reproducible, and cost effective casting technique for a shutdown separator with, for example, a combination of poly(vinylidene fluoride-co-hexafluoropropylene) (PVdF-HFP) copolymer, polysulfonamide (PSA)/polyether imide (PEI), and CaCO3 powder, and for a non-shutdown separator with, for example, a combination of polysulfonamide (PSA)/polyether imide (PEI), filler/plasticizer, and metal oxide nanostructures (SiO2, TiO2, and Al2O3).

In an exemplary casting process, 0.70 g metal oxide particles and 0.50 g CaCO3 (filler) were dispersed in Acetone (2.60 g) by ultrasonication for 1 h. 2.50 g of 12 wt % PSA solution was added to 0.70 g metal oxide and 0.50 g filler dispersed solution and then stirred for 1 h followed by vortexing for 10 min, continuous stirring for 3 h, and sonication for 30 min, followed by stirring for 20 h. The uniformly mixed solution was cast on a glass plate using a doctor blade. Cast samples were then dried at room temperature for 12 h. The dried samples were soaked in 0.1M HCl for 3 h followed by washing with distilled water several times and then dried at room temperature for 12 h. The room temperature dried sample was dried for 24 h at 100° C. in a vacuum. Afterwards, the separator material was kept in a desiccator until used.

In another exemplary casting process, the metal oxide particles (0.60 g) and 0.50 g PEG-400 (pore farmer) were dispersed in acetone (2.60 g) by ultrasonication for 1 h. 3.32 g of 12 wt % PSA solution was added to 0.60 g of metal oxide and 0.50 g pore farmer dispersed solution and then stirred for 1 h followed by vortexing for 10 min, and continued stirring for 23 h. The uniformly mixed solution was cast on a glass plate using a doctor blade. Cast samples were then dried at room temperature for 12 h. The dried sample was soaked in 20 wt % glycerol and 80 wt % distilled water for 3 h followed by washing with distilled water several times and then drying at room temperature for 6 h. The room temperature dried sample was dried for 24 h at 100° C. in a vacuum. Afterwards, the separator was kept in a desiccator until used.

In a further exemplary casting process, the metal oxide particles (0.40 g) and 0.50 g CaCO$_3$ (filler) were dispersed in Acetone (2.60 g) by ultrasonication for 1 h. 3.6 g of 20 wt % PEI solution (0.6 g of PEI solid content) was added to 0.40 g of metal oxide and 0.50 g filler dispersed solution and then stirred for 1 h followed by vortexing for 10 min, continuous stirring for 3 h, sonication for 30 min followed by stirring for 20 h. The uniformly mixed solution was cast on a glass plate using a doctor blade. Cast samples were then dried at room temperature for 12 h. The dried samples were soaked in 0.1M HCl for 3 h followed by washing with distilled water several times and then drying at room temperature for 12 h. The room temperature dried sample was dried for 24 h at 100° C. in a vacuum. Afterwards, the separator was kept in a desiccator until used.

In a still further exemplary casting process, various compositions of cellulose acetate (CA) and polysulfonamide (PSA) polymers were homogenized in a minimum amount of N,N-dimethylacetamide (DMAc) and acetone, e.g., 0.75 g of CA and 0.25 g of PSA in 4.5 g DMAc and 1.41 g acetone, until a viscous solution formed. The Sb$_2$O$_3$ (20 wt %, particle size 5 μm) was introduced, gently, mixed, and sonicated for homogenization before casting on glass plate using a doctor blade and then dried at 75° C. for 5 h in an oven, and at 80° C. for 15 h in vacuum. Triethyl citrate was used as a plasticizer to decrease the brittleness of the separators. Afterwards, the separator was kept in a desiccator until used.

In a still further exemplary casting process, various compositions of PVDF-HFP and PVP polymers were homogenized in a minimum amount of dry dimethylformamide (DMF), e.g., 0.65 g of PVDF-HFP and 0.35 g of PVP in 2.5 mL DMF, until a viscous solution was formed. The Sb$_2$O$_3$ (30 wt %, particle size 5 μm) was introduced, gently, mixed, and sonicated for homogenization before casting on PTFE cloth using a blade and then dried at 80° C. for 48 h. Afterwards, the separator was kept in a desiccator until used.

In an another approach casting process, a measured amount of PVDF-HFP and PS powder (85/15, w/w) was homogeneously dissolved in a mixture of acetone/N, N-dimethylacetamide (3:1, w/w) forming a 20 wt % solution. Various compositions of metal oxides (SiO$_2$, Al$_2$O$_3$ and TiO$_2$) were introduced, gently, mixed, and sonicated for homogenization before casting on glass plate using a doctor blade and then dried at 75° C. for 5 h in an oven, and at 80° C. for 15 h in vacuum. The thickness of the nonwoven films used was about 20-30 μm. Afterwards, the separator was kept in a desiccator until used.

Prior to fabrication of the lithium ion battery, shutdown and non-shutdown separators were subjected to Scanning Electron Microscopy (SEM), porosity, wettability, DSC-TGA, dimensional stability, permeability, conductivity, and cyclic voltammetry analysis to confirm the porosity, wettability, thermal stability, Gurley value, ionic conductivity, and electrochemical stability window of the separators.

Figure 2:
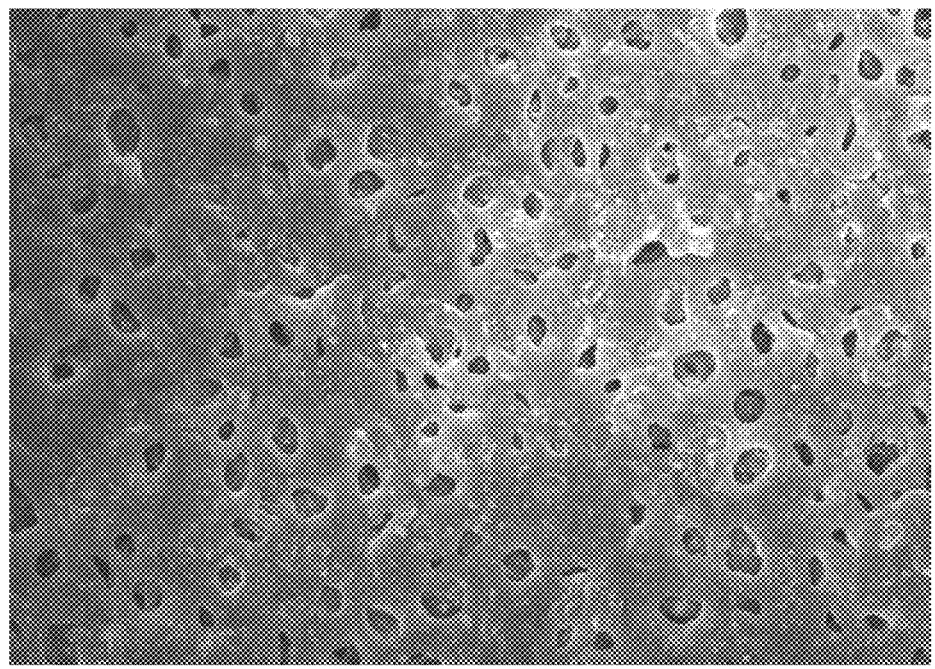
FIG. 2 is a SEM image of an exemplary non-shutdown separator of the present invention.
Figure 3:
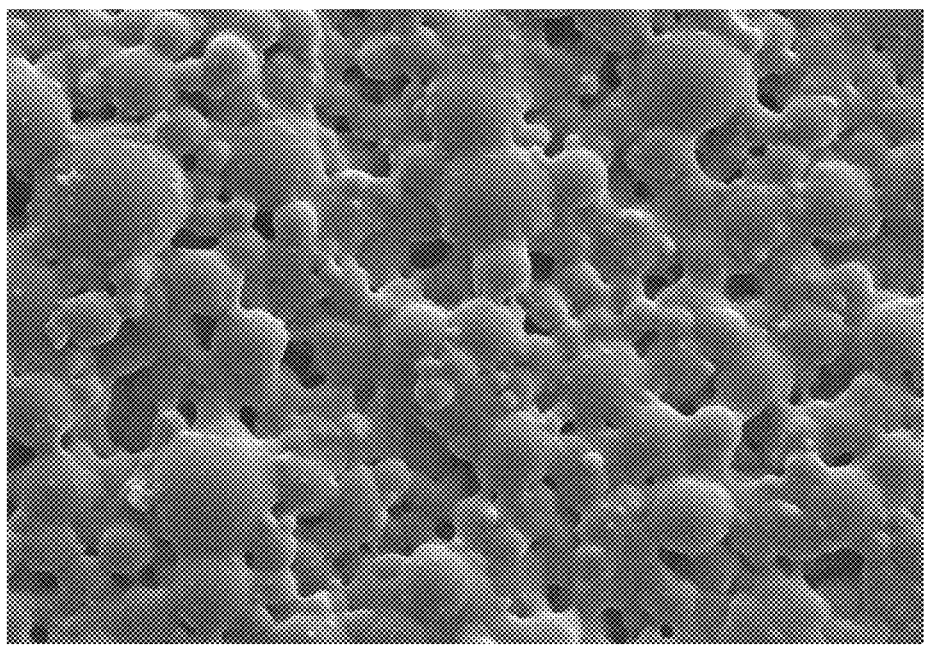
FIG. 3 is a SEM image of an exemplary shutdown separator of the present invention.

SEM was done by placing the separators on to a carbon tape and subjecting them to SEM analysis. As expected, a typical highly symmetric sponge-like structure was formed and uniformly distributed throughout the non-shutdown separators. This is illustrated in FIG. 2. The pore size ranged from 0.5~1.0 μm and the porosity was determined to be >70%. High porosity is deemed to be favorable for high electrolyte uptake and high ion conductivity. A highly rough surface with pores formed throughout the surface of the shutdown separators, as illustrated in FIG. 3.

To investigate the ability of the experimental separators to absorb electrolyte, the samples were immersed in a 1M LiPF6 solution of ethylene carbonate and dimethyl carbonate (50:50) for 2 h. Samples were removed from the electrolyte immersion and blotted dry with a Kimwipe to remove excess surface liquids. Each sample was weighed prior to and following the electrolyte immersion and the amount of electrolyte absorbed was collected. Table 1 below contains the results of the electrolyte wettability experiment.

TABLE 1

The wettability of each separator following 2 h immersion in 1M LiPF6 solution of EC/DMC.

| Sample (wt. %/wt. %) | $W_{dry}$ (g) | $W_{wet}$ (g) | Wettability (%) |
|---|---|---|---|
| PVDF-HFP/PS (85/15) | 0.0141 | 0.0283 | 101 |
| PVDF-HFP/PS/TiO$_2$ (45/15/40) | 0.0127 | 0.0272 | 114 |
| PVDF-HFP/PS/SiO$_2$ (65/15/20) | 0.0149 | 0.0232 | 56 |
| PVDF-HFP/PS/Al$_2$O$_3$ (65/15/20) | 0.0137 | 0.0217 | 58 |
| PVDF-HFP/PSA (50/50) | 0.0039 | 0.0088 | 125 |
| PVDF-HFP/PSA/CaCO$_3$ (50/50/50) | 0.0052 | 0.0147 | 167 |
| PVDF-HFP/PVP/PSA (40/10/50) | 0.0054 | 0.0090 | 67 |
| PVDF-HFP/PVP/PSA/ CaCO$_3$ (40/10/50/50) | 0.0071 | 0.0124 | 75 |
| SiO$_2$/PSA/TEC (70/20/10) | 0.0032 | 0.0055 | 72 |

TABLE 1-continued

The wettability of each separator following 2 h immersion in 1M LiPF6 solution of EC/DMC.

| Sample (wt. %/wt. %) | $W_{dry}$ (g) | $W_{wet}$ (g) | Wettability (%) |
|---|---|---|---|
| SiO$_2$/PSA/CaCO$_3$ (50/50/50) | 0.0049 | 0.0111 | 126 |
| SiO$_2$/PSA/CaCO$_3$ (60/40/50) | 0.0080 | 0.0168 | 110 |
| SiO$_2$/PSA/CaCO$_3$ (50/50/75) | 0.0051 | 0.0141 | 176 |
| SiO$_2$/PSA/CaCO$_3$ (50/50/100) | 0.0079 | 0.0161 | 111 |
| SiO$_2$/PSA/PEG400 (60/40/50) | 0.0064 | 0.0112 | 75 |
| PSA/CaCO$_3$ (50/50) | 0.0061 | 0.0119 | 95 |
| Al$_2$O$_3$/PSA/CaCO$_3$ (50/50/50) | 0.0070 | 0.0141 | 101 |
| Al$_2$O$_3$/PSA/CaCO$_3$/ (60/40/50) | 0.0055 | 0.0113 | 78 |
| Al$_2$O$_3$/PSA/CaCO$_3$ (70/30/50) | 0.0064 | 0.0156 | 144 |
| Al$_2$O$_3$/PSA/TEC (75/20/5) | 0.0062 | 0.0115 | 85 |
| Al$_2$O$_3$/PSA/PEG400 (60/40/50) | 0.0093 | 0.0155 | 66 |
| TiO$_2$/PSA/PEG400 (60/40/50) | 0.0051 | 0.0118 | 105 |
| TiO$_2$/PSA/CaCO$_3$ (60/40/50) | 0.0054 | 0.0096 | 77 |
| TiO$_2$/PSA/CaCO$_3$ (70/30/50) | 0.0040 | 0.0083 | 107 |
| TiO$_2$/PSA/CaCO$_3$ (40/60/50) | 0.0066 | 0.0131 | 98 |
| TiO$_2$/PSA/TEC (75/20/5) | 0.0030 | 0.0063 | 110 |
| TiO$_2$/PSA/TEC (70/20/10) | 0.0099 | 0.0154 | 55 |
| PSA/PEG400 (50/50) | 0.0045 | 0.0083 | 84 |
| PSA/PEG400/CaCO$_3$ (50/50/50) | 0.0041 | 0.0074 | 80 |
| PSA/PEG400/CaCO$_3$ (75/25/25) | 0.0060 | 0.0099 | 65 |

The porosity of the shutdown and non-shutdown separators was determined using an n-butanol method after soaking 2 h in n-butanol. The porosity of each separator is shown in Table 2. Results show that all of the separators exhibited porosity comparable with the commercially available separators porosity (>50%).

TABLE 2

The porosity of each separator following 2 h immersion in 1-butanol.

| Sample (wt. %/wt. %) | $W_{dry}$ (g) | $W_{wet}$ (g) | Volume (cm$^3$) | Porosity (%) |
|---|---|---|---|---|
| PEI/CaCO$_3$ (50/50) | 0.0024 | 0.0067 | 0.004 | 133 |
| SiO$_2$/PEI/CaCO$_3$ (40/60/50) | 0.0023 | 0.0046 | 0.004 | 71 |
| TiO$_2$/PEI/CaCO$_3$ (40/60/50) | 0.0044 | 0.0084 | 0.004 | 124 |
| Al$_2$O$_3$/PEI/CaCO$_3$ (40/60/100) | 0.0042 | 0.0102 | 0.006 | 123 |
| PEI/PVDF-HFP/PVP (50/40/10) | 0.0054 | 0.0089 | 0.006 | 86 |
| PEI/PVDF-HFP (50/50) | 0.0065 | 0.0084 | 0.006 | 74 |
| PEI/PSA/CaCO3 (50/50/50) | 0.0063 | 0.0127 | 0.006 | 185 |
| PSA/CaCO$_3$ (50/50) | 0.0041 | 0.0058 | 0.004 | 52 |
| SiO$_2$/PSA/CaCO$_3$ (50/50/50) | 0.0053 | 0.0073 | 0.004 | 62 |
| SiO$_2$/PSA/CaCO$_3$ (50/50/75) | 0.0081 | 0.0120 | 0.004 | 120 |
| SiO$_2$/PSA/CaCO$_3$ (50/50/100) | 0.0050 | 0.0110 | 0.004 | 185 |
| SiO$_2$/PSA/CaCO$_3$ (60/40/50) | 0.0078 | 0.0109 | 0.004 | 81 |
| SiO$_2$/PSA/PEG400 (60/40/50) | 0.0064 | 0.0096 | 0.004 | 83 |
| Al$_2$O$_3$/PSA/CaCO$_3$ (50/50/50) | 0.0060 | 0.0112 | 0.004 | 160 |
| Al$_2$O$_3$/PSA/CaCO$_3$ (60/40/50) | 0.0093 | 0.0131 | 0.006 | 78 |
| Al$_2$O$_3$/PSA/CaCO$_3$ (70/30/50) | 0.0055 | 0.0122 | 0.004 | 174 |
| Al$_2$O$_3$/PSA/PEG400 (60/40/50) | 0.0053 | 0.0095 | 0.004 | 130 |
| Al$_2$O$_3$/PSA/TEC (75/20/5) | 0.0059 | 0.0105 | 0.004 | 142 |
| TiO$_2$/PSA/CaCO$_3$ (60/40/50) | 0.0050 | 0.0073 | 0.004 | 71 |
| TiO$_2$/PSA/CaCO$_3$ (70/30/50) | 0.0038 | 0.0083 | 0.004 | 117 |
| TiO$_2$/PSA/CaCO$_3$ (40/60/50) | 0.0063 | 0.0080 | 0.004 | 52 |
| TiO$_2$/PSA/PEG400 (60/40/50) | 0.0045 | 0.0065 | 0.004 | 62 |
| TiO$_2$/PSA/TEC (75/20/5) | 0.0055 | 0.0071 | 0.003 | 66 |
| TiO$_2$/PSA/TEC (70/20/10) | 0.0090 | 0.0105 | 0.004 | 46 |
| PSA/PEG400 (50/50) | 0.0051 | 0.0078 | 0.002 | 83 |
| PSA/PEG400/CaCO$_3$ (75/25/25) | 0.0055 | 0.0076 | 0.002 | 64 |
| PSA/PEG400/CaCO$_3$ (50/50/50) | 0.0047 | 0.0082 | 0.002 | 108 |
| PSA/PVDF-HFP/CaCO$_3$ (50/50/50) | 0.0055 | 0.0075 | 0.004 | 62 |
| PSA/PVDF-HFP/PVP/CaCO$_3$ (50/40/10/50) | 0.0063 | 0.0081 | 0.004 | 55 |

Figure 4:
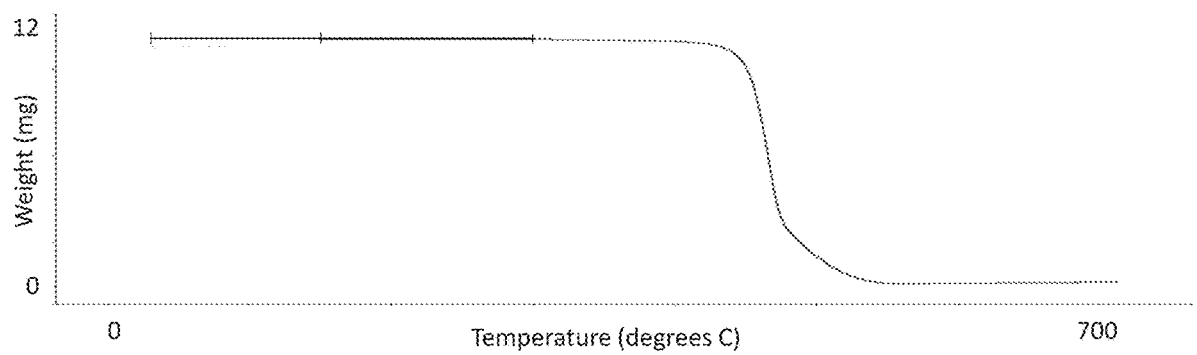
FIG. 4 is a plot of a TGA curve of an exemplary shutdown separator of the present invention.
Figure 5:
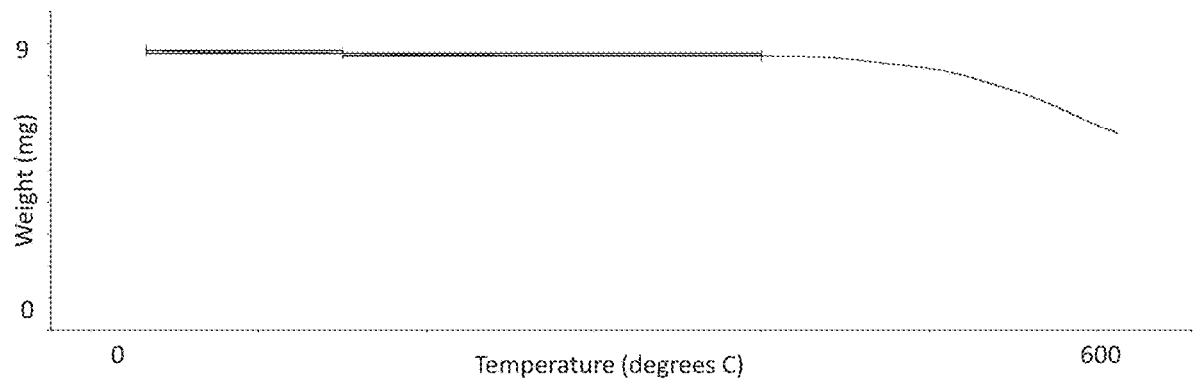
FIG. 5 is a plot of a TGA curve of an exemplary non-shutdown separator of the present invention.

Thermal degradation studies were conducted on shutdown and non-shutdown separators from 30-600° C. under N2 gas atmosphere using a Perkin Elmer TGA instrument. FIGS. 4 and 5 show the TGA curves of shutdown and non-shutdown separators, respectively. The first and second weight loss results are shown in Table 3. The higher thermal stability of the separator is attributed to the presence of the metal oxide, which can enforce a limit on the mobilization of polymer macromolecules and conduct heat homogeneously, thereby avoiding any heat concentration in the composite.

TABLE 3

The first & second weight loss of each separator in the temperature range 30-400° C.

| Sample (wt. %/wt. %) | First weight loss (mg) | Second weight loss (mg) | First weight loss temp. range (° C.) | Second weight loss temp. range (° C.) |
|---|---|---|---|---|
| PVDF-HFP/PS (85/15) | 0.025 | 0.046 | 30-150 | 150-300 |
| (PVDF-HFP/PS)/SiO$_2$ (80/20) | 0.018 | 0.124 | 30-150 | 150-300 |
| (PVDF-HFP/PS)/TiO$_2$ (80/20) | 0.019 | 0.051 | 30-150 | 150-300 |
| PSA/CaCO$_3$ (50/50) | 0.270 | 0.134 | 30-150 | 150-400 |
| SiO$_2$/PSA/CaCO$_3$ (50/50/50) | 0.240 | 0.138 | 30-150 | 150-400 |
| SiO$_2$/PSA/PEG400 (60/40/50) | 0.131 | 0.369 | 30-150 | 150-400 |
| TiO$_2$/PSA/CaCO$_3$ (70/30/50) | 0.093 | 0.084 | 30-150 | 150-400 |
| Al$_2$O$_3$/PSA/CaCO$_3$ (70/30/50) | 0.147 | 0.131 | 30-150 | 150-400 |

Based on the above results, we have achieved highly thermal stability (>200° C.) in comparison with commercially available separators' thermal stability (<200° C.). TiO2 filled separators show higher thermal stability as compared to the SiO2 and Al2O3 filled separators due to TiO2 having a less hydrophilic nature as compared to silica and alumina.

Figure 6:
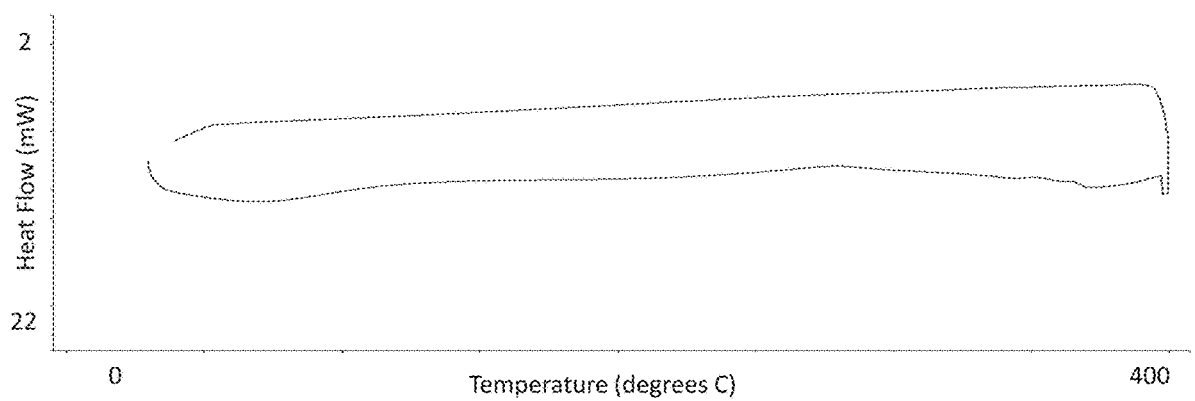
FIG. 6 is a plot of a DSC curve of an exemplary non-shutdown separator of the present invention.
Figure 7:
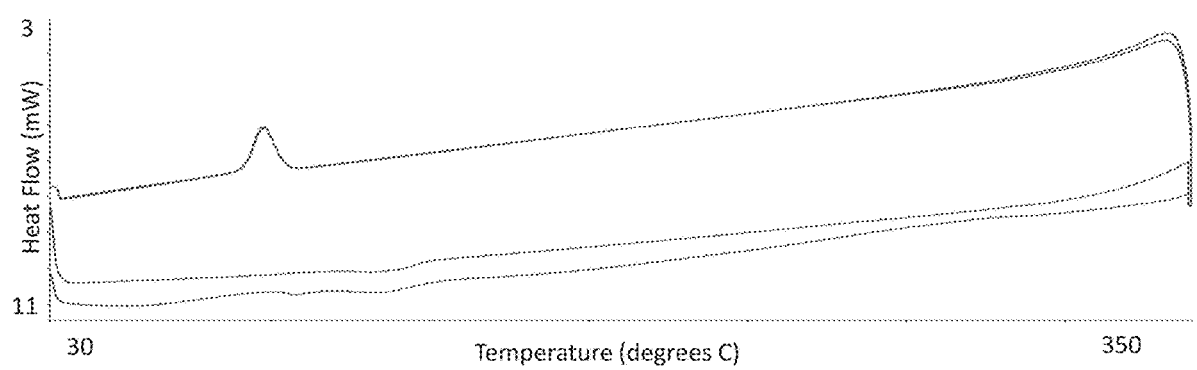
FIG. 7 is a plot of a DSC curve of an exemplary shutdown separator of the present invention.

Melting temperature studies were conducted on shutdown and non-shutdown separators from 30-400° C. under N2 gas atmosphere using a Perkin Elmer DSC instrument. FIGS. 6 and 7 show the DSC curves of non-shutdown and shutdown separators. Thermograms show no peaks present, indicating that the polymer exists in an amorphous phase. The non-shutdown separator possesses superior thermal stability over 350° C., evidently, as no melting temperature peak is identified in the range of 30 to 350° C. These separators can be used as non-shutdown separators. The shutdown separators exhibit two melting temperature peaks at 108° C. and 140° C. in the first cycle, where as one peak at 140° C. in the second cycle. This separator could be used as a shutdown separator. At 140° C., PVDF-HFP is melting and fills the pores of the separator and stops the ion transport, current flow in the cell, and also prevents shortening of electrodes due to high thermal stability and dimensional stability of polysulfonamide at increased temperatures of the cell. Similar features are observed in polyethylene (135° C.) and polypropylene (165° C.) separators, except the prevention of shortening the anode and cathode due to high thermal shrinkage at elevated temperatures.

Both TGA and DSC profiles show that no unusual phase changes or weight losses occur in the temperature range between 30 and 400° C., which makes the material thermally stable and useful as a separator under standard operating conditions in real battery configurations.

Figure 8:
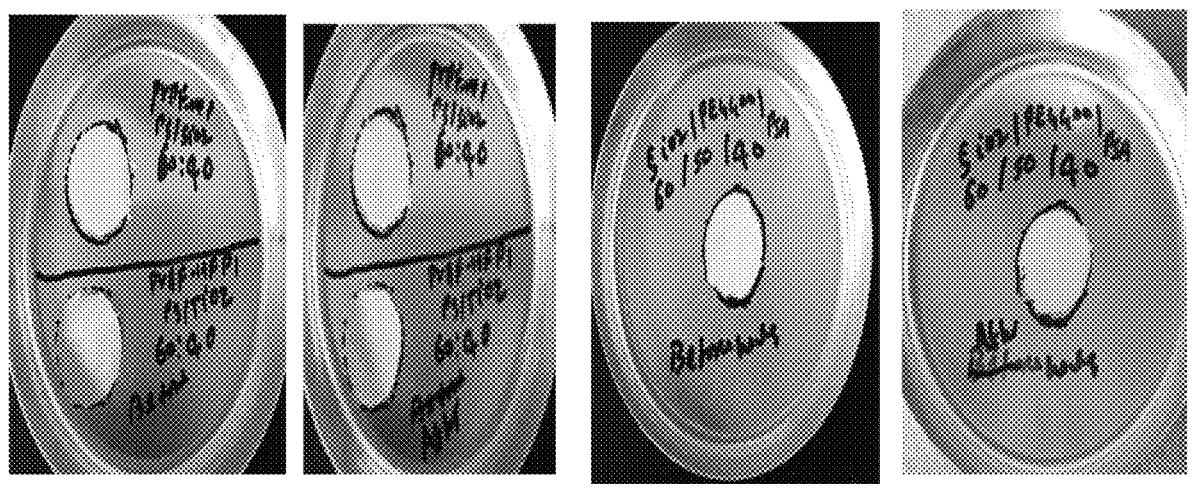
FIG. 8 shows digital images of shutdown and non-shutdown separators before and after heating at 200° C. for 30 min in an oven.
Figure 9:
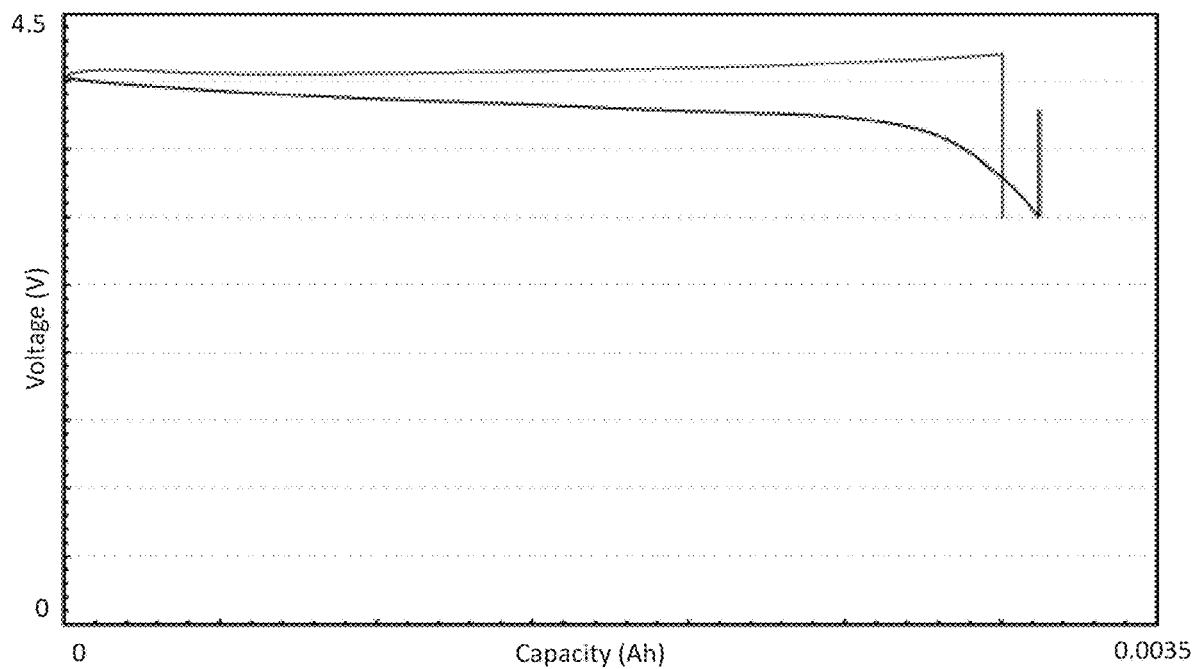
FIG. 9 illustrates a Sample 1 voltage vs. capacity profile.
Figure 10:
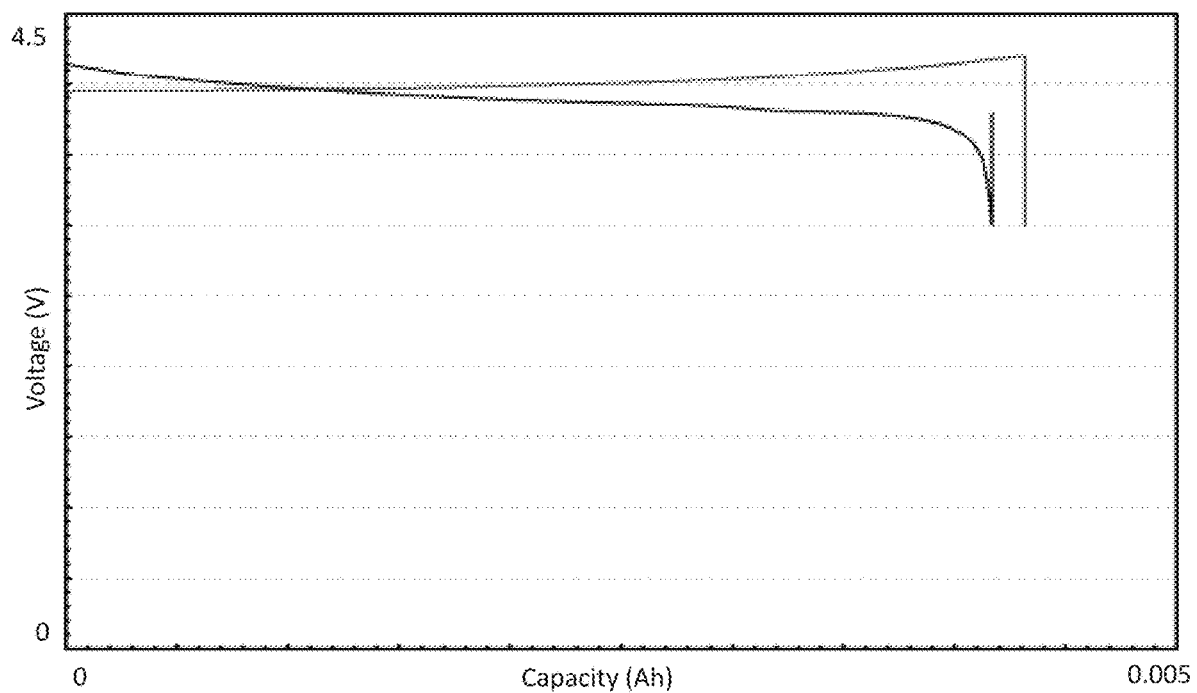
FIG. 10 illustrates a Sample 4 voltage vs. capacity profile.
Figure 11:
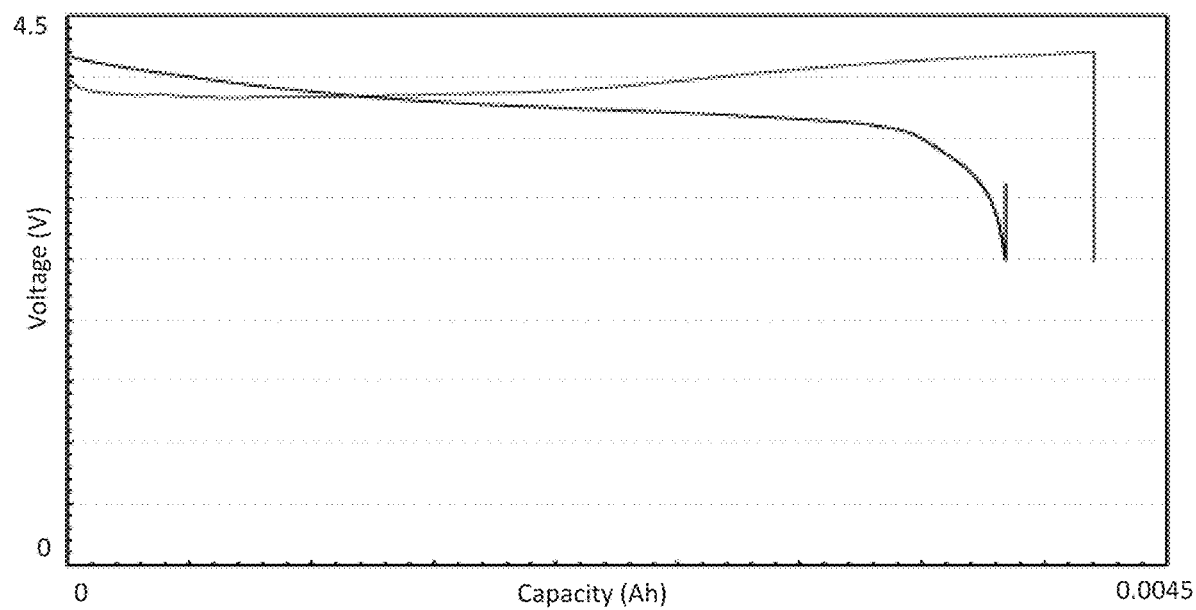
FIG. 11 illustrates a Sample 14 voltage vs. capacity profile.
Figure 12:
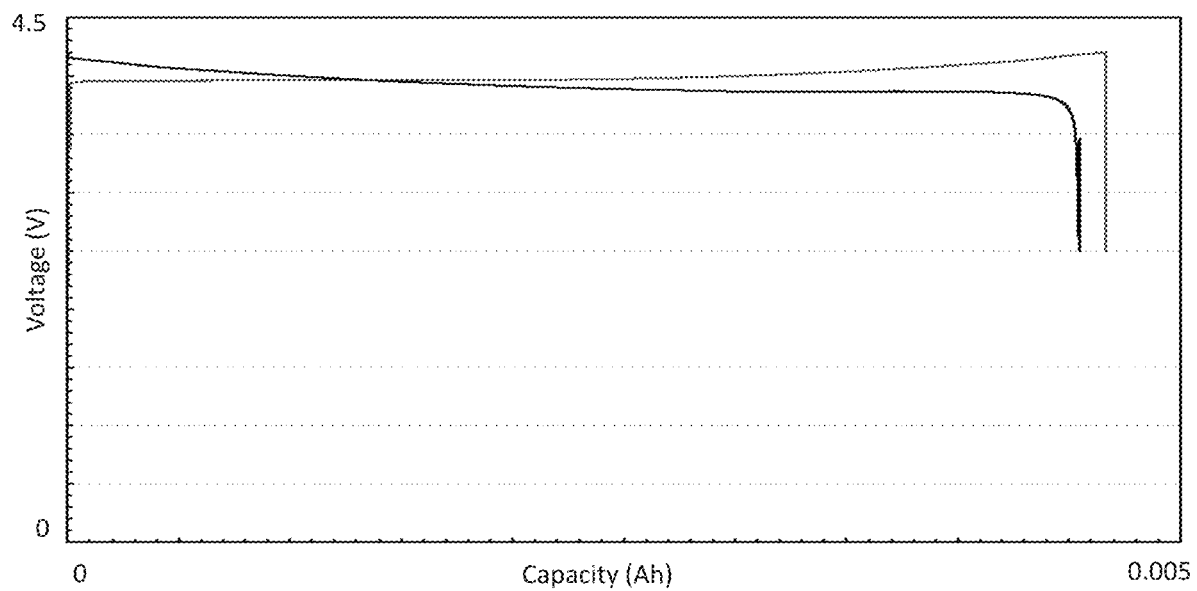
FIG. 12 illustrates a Sample 49 voltage vs. capacity profile.

FIG. 8 shows the digital images of shutdown and non-shutdown separators before and after heating at 200° C. for 30 min in an oven. No dimensional changes were observed after heating. This confirms that the separator maintains dimensional stability.

This unique thermal property of the PSA/Metal Oxide and PVDF-HFP/PS/Metal Oxide separators can effectively prevent the potential short circuit in lithium ion batteries. Conventional separators can easily catch fire, leading to explosion. Since PSA and PVDF-HFP/PS are fire resistant, PSA/Metal Oxide and PVDF-HFP/PS/Metal Oxide separators are fire-safe.

The sample 11A separator shows the highest tensile strength (in both directions) in comparison with the other separators. Better mechanical strength comes from relatively higher crystallinity and the orientation of polymer segments driven by the biaxial stretching process during separators preparation.

TABLE 4

Tensile Strength of each separator.

| Specimen Type | Manufacturing Direction | Maximum Load [N] | Tensile Strength [kgf/cm 2] | Max Elongation [%] |
|---|---|---|---|---|
| 1A | MD | 3.43 | 116.43 | 2.66 |
| 1A | TD | 4.28 | 145.39 | 3.06 |
| 2A | MD | 14.51 | 493.12 | 5.44 |
| 2A | TD | 16.56 | 562.88 | 8.87 |
| 3A | MD | 7.10 | 361.77 | 3.40 |
| 3A | TD | 9.13 | 465.52 | 3.69 |
| 4A | MD | 14.48 | 492.06 | 4.78 |
| 4A | TD | 16.09 | 546.88 | 6.60 |
| 5A | MD | 7.34 | 62.38 | 6.69 |
| 5A | TD | 8.66 | 73.60 | 10.19 |
| 6A | MD | 4.75 | 484.59 | 3.81 |
| 6A | TD | 2.66 | 271.00 | 4.28 |
| 7A | MD | 12.68 | 646.41 | 12.25 |
| 7A | TD | 15.06 | 768.08 | 13.78 |
| 8A | MD | 6.96 | 101.38 | 6.24 |
| 8A | TD | 5.36 | 78.15 | 4.40 |
| 9A | MD | 2.86 | 583.24 | 5.65 |
| 9A | TD | 2.21 | 450.50 | 3.75 |
| 10A | MD | 6.07 | 206.32 | 7.10 |
| 10A | TD | 3.49 | 118.68 | 1.92 |
| 11A | MD | 8.84 | 1803.23 | 8.24 |
| 11A | TD | 8.75 | 1784.25 | 10.02 |
| 12A | MD | 3.86 | 786.73 | 2.85 |
| 12A | TD | 1.95 | 397.55 | 1.33 |

The air permeability (Gurley value) study was conducted on non-shutdown separators using a 4340N Permeometer at 23° C. and 70% relative humidity. This is determined by measuring the time for a settled volume of air to pass through the separator with a fixed area under the pressure of 0.02 MPa. Gurley values of the separators are given in the Table 5. In general, high Gurley value corresponds to low air permeability and a long tortuous path for air transportation, implying higher curvature for pores. The Gurley value of the some of the separators is higher than that of a referenced separator. This kind of pore structure is believed to own high curvature to provide effective internal short circuit protection and to reduce liquid electrolyte. The high curvature pore structure is believed to transport lithium ions and help the battery to effectively avoid internal short circuit, at the same time.

TABLE 5

Gurley values and pore size of each separator.

| Sample No: | Sample (wt. %/wt. %) | Gurley value sec/100 mL | Pore size (μm) |
|---|---|---|---|
| 1 | PSA/CaCO$_3$ (50/50) | 175.26 | 0.0625 |
| 2 | TiO$_2$/PSA/CaCO$_3$ (70/30/50) | 58.10 | — |
| 3 | SiO$_2$/PSA/CaCO$_3$ (50/50/50) | 360 | — |
| 4 | SiO$_2$/PSA/CaCO$_3$ (60/40/50) | 210 | — |
| 5 | SiO$_2$/PEI/CaCO$_3$ (60/40/50) | 38.15 | 0.0928 |
| 6 | TiO$_2$/PEI/CaCO$_3$ (60/40/50) | 400.26 | 0.0374 |
| 7 | PEI/CaCO$_3$ (50/50) | 552.90 | 0.0161 |
| 8 | SiO$_2$/PSA/CaCO$_3$ (60/40/50) | 834.35 | 0.0224 |
| 9 | TiO$_2$/PSA/CaCO$_3$ (40/60/50) | 420.35 | 0.0331 |
| 10 | SiO$_2$/PSA/CaCO$_3$ (50/50/75) | 125.39 | 0.0720 |
| 13 | Celgard 2500 | 200 | 0.064 |

At high frequencies, where the imaginary impedance response approaches zero, the real impedance is a representative value of resistance for the membrane. Using the below equation, the bulk resistivity was then used to calculate the ionic conductivity for each sample membrane as well as for two control separator membranes.

$$\delta = \frac{d}{R * A} \quad (1)$$

in which, δ is the ionic conductivity (mS/cm), d is the thickness of the membrane, R is the bulk resistivity, and A is the area of the membrane.

TABLE 6

Ionic conductivity of prospective separator candidates.

| Candidate | Thickness (mm) | Resistance (Ω) | Ionic Conductivity (mS/cm) |
|---|---|---|---|
| Sample 1 | 0.100666667 | 3.6 | 1.58 |
| Sample 4 | 0.105 | 4.55 | 1.30 |
| Sample 15 | 0.077 | 5.7 | 0.76 |

Table 6 above lists the calculated ionic conductivities of the three separator samples when swollen with a standard LiPF6 in EC:DEC electrolyte. When compared to a typical porous polypropylene separator (~0.8 mS/cm) and glass fiber separators (3.4 mS/cm), the separator samples tested here display similar ionic conductivities. While sample 15 has close to the same conductivity as polypropylene, samples 1 and 4 are closer to that of the nonwoven glass fiber separators (when swollen with the same electrolyte). For reference, the liquid electrolyte used has an ionic conductivity of ~12 mS/cm. Although each cell has been tested in a coin cell, the ionic conductivity data supports the legitimacy of the samples to perform acceptably in energy storage devices.

During the electrochemical investigation, several prospective samples showed promising performance when utilized as separator materials in lithium cathode ½-coin cells. Each sample was dried in an oven at 80° C. for 24 h prior to testing. Following drying, samples were immersed in a standard electrolyte (1M LiPF6 EC/DEC (3/7)) for 2 h to allow full electrolyte impregnation. ½-cell cathode coin cells were assembled by first drying a Lithium Cobalt Oxide (LCO) cathode material at 80° C. for 12 h. LCO cathode punches (1.77 cm2) were placed into Hoshen coin cells followed by 75 µl of electrolyte, the separator samples to be evaluated, a lithium chip (Gelon), two 0.5 mm stainless steel spacers (1.5 cm diameter), a wave spring washer, and finally the anode coin cell lid, resulting in a 4.4 mAh coin cell. Each sample was prepared in a dry room with a relative humidity <1% (dew point −46° C. and a room temperature of 68° F.). The cells were subjected to a C/20 charge and discharge cycle, followed by several C/10 cycles. FIGS. 9-12 are the initial cycle voltage profiles for the four promising cells along with the cycle life for each cell.

As shown in FIGS. 9-12, the Sample 1 separator candidate showed a relatively level voltage plateau during both charge and discharge with a nominal operational voltage of 3.7 V during discharge. Sample 4 displayed similar voltage characteristics during the first charge and discharge cycle, achieving very close to the calculated expected capacity. Sample 4 cells also were able to cycle close to 100 cycles before beginning to lose capacity. Sample 15 has undergone a handful of cycles. However, the initial voltage profile, and the first 4 cycles suggest that this candidate has a strong potential to perform well as a separator for lithium batteries. Sample 49 had higher initial coulombic efficiency. However, the initial voltage profile and cycles suggest that these candidates have a strong potential to perform well as a separator for lithium batteries.

Sample 1# PVDF-HFP+PVP (0.65 g: 0.35 g)
Sample 4# PVDF-HFP+PVP+Sb2O3 (0.50 g: 0.20 g: 0.3 g)
Sample 14# TiO2+PSA+TEC (0.70 g: 0.20 g: 0.10 g)
Sample 49# Al2O3+PEG400+PSA (0.6 g: 0.5 g: 0.4 g)

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A single layer, fire-resistant shutdown separator for an electrochemical device, comprising:
a single film, amorphous porous planar cast structure defining curved and rounded-like shaped pores uniformly distributed throughout a sponge-like structure of the single film, amorphous porous planar cast structure providing mechanical strength in both machine and transverse directions, comprising:
a plurality of polymeric materials comprising at least a first polymeric material having a relatively lower melting point, wherein the first polymeric material comprises a poly(vinylidene fluoride-co-hexafluoropropylene) (PVdF-HFP) copolymer, and a second polymeric material having a relatively higher melting point, wherein the second polymeric material comprises polysulfonamide (PSA); and
a filler material comprising calcium carbonate;
wherein the filler material has a particle size of between about 0.1 micron and about 1 micron and the amorphous porous planar cast structure has a thickness of between about 10µ and about 100µ, a pore size between about 0.0161 micron and about 1 micron, and a porosity of between about 50% and about 80% forming the single layer, fire-resistant shutdown separator, wherein the separator has a wettability of at least about 167% as measured by a two hour immersion in 1 M LiPF6 solution of ethylene carbonate and dimethyl carbonate (50:50).

2. The shutdown separator of claim 1, wherein the second polymeric material further comprises one or more of polyether imide (PEI) and polystyrene (PS).

3. The shutdown separator of claim 1, wherein the plurality of polymeric materials comprise polymeric materials selected from the group consisting of: a poly(vinylidene fluoride) polyolefin, a polysulfone, polyvinyl chloride, polyvinyl fluoride, a polytetrafluoroethylene-polystyrene copolymer, a polyamide, a polyphenyleneoxide-polysterene copolymer, and a polycarbonate.

4. The shutdown separator of claim 1, wherein the filler material comprises one or more of calcium stearate, silica, alumina, titanium oxide, and antimony oxide.

5. The shutdown separator of claim 1, wherein the filler material comprises one or more of mica, barium carbonate, barium sulfate, calcium oxide, calcium sulfate, clay, diatomaceous earth, glass powder, kaolin, magnesium carbonate, magnesium sulfate, magnesium oxide, silica clay, talc, zinc oxide, a poly(hexamethylene adipamide) powder, a polyethylene terephthalate powder, and beads of polystyrene divinyl benzene.

6. The shutdown separator of claim 1, wherein the first polymeric material is configured to melt to fill pores in the porous planar structure at a temperature of between about 100° C. and about 160° C.

7. The shutdown separator of claim 6, wherein the first polymeric material is configured to melt to fill pores in the porous planar structure at a temperature of about 140° C.

8. The shutdown separator of claim 1, further comprising a metal oxide.

9. The shutdown separator of claim 1, wherein the porous planar structure is disposed within an electrolyte solution disposed with the electrochemical device, and wherein the electrochemical device further comprises a housing containing the porous planar structure, the electrolyte solution, an anode, and a cathode.

10. An electrochemical device, comprising:
a housing;
an electrolyte solution disposed within the housing;
an anode disposed within the electrolyte solution in the housing;
a cathode disposed within the electrolyte solution in the housing; and
one of a single layer, fire-resistant shutdown separator and a non-shutdown separator disposed within the electrolyte solution in the housing;
wherein, when used, the single layer, fire resistant shutdown separator comprises a single film, amorphous porous planar cast structure defining curved and rounded-like shaped pores uniformly distributed throughout a sponge-like structure of the single film, amorphous porous planar cast structure providing mechanical strength in both machine and transverse directions, comprising:
a plurality of polymeric materials comprising at least a first polymeric material having a relatively lower melting point, wherein the first polymeric material comprises a poly(vinylidene fluoride-co-hexafluoropropylene) (PVdF-HFP) copolymer, and a second polymeric material having a relatively higher melting point, wherein the second polymeric material comprises polysulfonamide (PSA); and a filler material comprising calcium carbonate;

wherein the filler material has a particle size of between about 0.1 micron and about 1 micron and the amorphous porous planar cast structure has a thickness of between about 10μ and about 100μ, a pore size between about 0.0161 micron and about 1 micron, and a porosity of between about 50% and about 80% forming the single layer, fire-resistant shutdown separator, wherein the separator has a wettability of at least about 167% as measured by a two hour immersion in 1 M LiPF6 solution of ethylene carbonate and dimethyl carbonate (50:50); and wherein, when used, the non-shutdown separator comprises an amorphous porous planar cast structure defining curved pores uniformly distributed throughout a sponge-like structure providing mechanical strength in both machine and transverse directions, comprising:

a polymeric material; and an inorganic particulate filler material;

wherein the filler material has a particle size of between about 0.1 micron and about 1 micron and the amorphous porous planar cast structure has a thickness of between about 10μ and about 70μ, a pore size between about 0.0161 micron and about 1 micron, and a porosity of between about 60% and about 200%.

* * * * *